Sept. 28, 1948.   G. SLAYTER ET AL   2,450,363
METHOD AND APPARATUS FOR MAKING
FINE GLASS FIBERS
Filed Jan. 4, 1945

INVENTOR.
Games Slayter
Ed Fletcher.
BY
Staelin & Overman
Attorneys.

Patented Sept. 28, 1948

2,450,363

UNITED STATES PATENT OFFICE 2,450,363

METHOD AND APPARATUS FOR MAKING FINE GLASS FIBERS

Games Slayter and Ed Fletcher, Newark, Ohio, assignors to Owens-Corning Fiberglas Corporation, Toledo, Ohio, a corporation of Delaware Application January 4, 1945, Serial No. 571,304

7 Claims. (Cl. 18—2.5)

1

The present invention relates generally to the manufacture of fine glass fibers.

One of the principal objects of this invention is to provide an improved method and apparatus for producing very fine glass fibers. In accordance with this invention fibers may be produced on a commercial scale which are as small as four hundred-thousandths to ten hundred-thousandths of an inch, or approximately one to two and one-half microns, and even less in diameter. Such fibers are ideally suited for making sewing thread, for the production of inorganic paper, as reinforcement for plastics and other material, for fine textiles, for highly resilient webs, mats and blankets for thermal and acoustic insulation, and for many other purposes where very fine fibers are desired.

This invention provides an improvement in the known process of manufacture of fine glass fibers in which relatively small glass rods or glass filaments are fed into a high speed, high temperature gaseous blast and melted and attenuated by the blast to form very fine fibers. The high speed, high temperature blast is formed by burning a combustible gaseous mixture within an enclosed chamber and exhausting the products of combustion through a restricted outlet orifice to accelerate the movement of the products of combustion to form a gaseous blast capable of attenuating the softened glass rods or filaments at very high rate.

It is an object of the present invention to provide improved apparatus for producing fine glass fibers in this general way and arranged in a highly compact unit.

It is a further object of the invention to provide a compact fiber forming unit including means for forming the glass rods or filaments closely coupled with means for attenuating the glass rods or filaments into very fine fibers.

It is another object of the invention to provide in such a unit means for attenuating molten glass to form the glass rods or filaments that will require a minimum of space so that the source of the molten glass for the rods or filaments may be closely related to the means for converting the rods or filaments to fine fibers.

It is still another object to provide a method and apparatus for producing fine glass fibers that are simple and efficient.

The foregoing, as well as other objects, will be made more apparent as this description proceeds, especially when considered in connection with the accompanying drawing, wherein:

2

Figure 1:
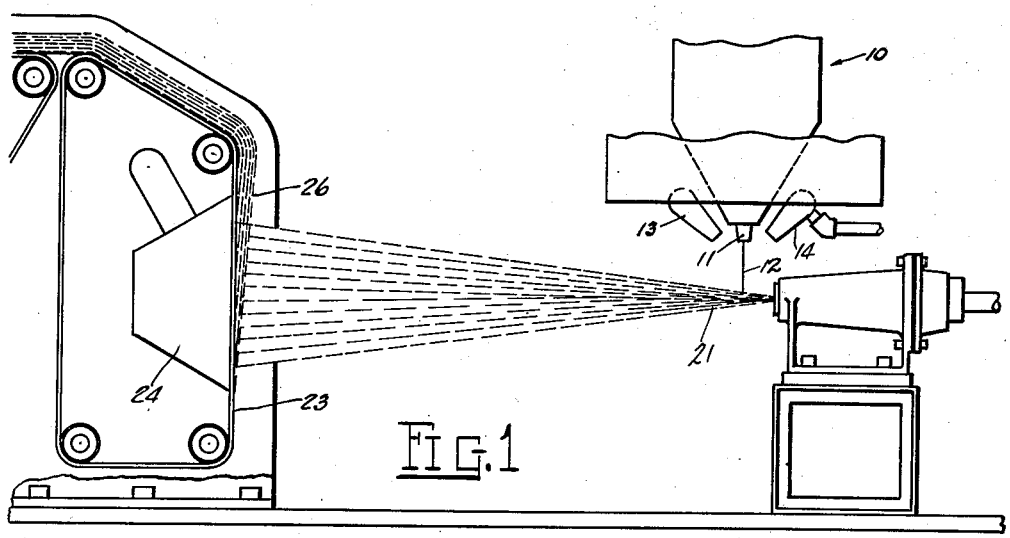
Figure 1 is a diagrammatic side elevational view of apparatus embodying the present invention.

Referring now more in detail to the drawing, the reference character 10 indicates a glass feeder which may be in the form of a long, narrow, metal-walled trough provided with a plurality of feeding orifices 11 in its bottom wall. Glass cullet or glass batch is fed into the feeder in any suitable manner and heated while in the bushing to a molten condition preferably by passing electric current through the walls of the feeder and through the glass therein. The molten glass flows from the orifices 11 in small streams which are attenuated to form filaments 12 by means of coacting blowers 13 and 14.

The blowers may be of any type suitable to direct blasts of gas onto the streams and in the general direction of flow of the streams. They are preferably of the continuous discharge slot type, that is, each blower comprises a pressure chamber 16 having an orifice 17 in the form of an elongated narrow slot for directing a broad flat blast to engage the series of streams flowing from the feeder. They are suitably supported at opposite sides of the orifices 11 and direct relatively low pressure air against the streams of glass as they issue from the orifices, the air moving in the general direction of flow of the glass streams so that the latter are attenuated to form glass filaments.

At normal operating temperatures the streams of molten glass flow from the orifices in the feeder by gravity and when a short distance below the feeder solidify to form glass filaments. Accordingly, the blasts of air from the blowers 13 and 14 need ordinarily be of low velocity to assist and control the gravity flow of the streams. The pressure of the air fed to the blower may be only enough to aid cooling of the streams as they flow by gravity or be increased to values ample to attenuate the streams to filaments at any desired rate.

Instead of air, other gases may be supplied to the blower, for example, steam, and the steam or air may be suitably heated to maintain the glass filaments at elevated temperature.

The temperature of the blasts from the blowers 13 and 14 is well below the softening temperature of the glass being attenuated so that the attenuated streams solidify a short distance below the orifices of the feeder and before being fed by the blasts into a secondary attenuating blast 21 formed of gases at high temperature. The heat of the secondary gaseous blast melts or softens the filaments as they are fed into the blast and the gases in the blast move at a high rate to attenuate the molten or softened filaments to fine fibers. The direction of movement of the blast is preferably transverse to the direction of feed of the filaments, and in the interest of high efficiency, at substantially right angles. With this transverse relation of the secondary attenuating blast and the filaments, the filaments may be displaced laterally by the force of the secondary attenuating blast. To balance this effect the velocity of the air from the primary attenuating blower 13 may be increased relative to the air from the other blower 14, thereby urging the filaments into a path related at a right angle or at other desired angle to the direction of the secondary attenuating blast.

As the filaments are attenuated into fine fibers by the secondary attenuating blast 21, the fibers are deposited by the blast on a suitable foraminous conveyor 23 that may be moved across the path of the blast-borne fibers. A suction chamber 24 may be disposed at the rear side of the conveyor 23 and arranged to extend over the deposition zone of the fibers to aid in collecting the fibers and causing them to build up into a unitary mat 26.

The high velocity of the secondary blast 21 is preferably obtained by burning a combustible gaseous mixture, such as a mixture of combustible gas and air, in an enclosed chamber and exhausting the products of combustion through an orifice of less cross-sectional area than the cross-sectional area of the chamber to guide and accelerate the gases resulting from combustion to form an intensely hot, high velocity blast. The type of combustible gas used may be of any suitable kind, but for reasons of economy is an ordinary fuel gas such as natural or manufactured fuel gas. This gas is mixed with the proper amount of air by means of a usual air and gas mixer. The gas and air mixture is taken from the mixer at moderate pressure of approximately two to six pounds per square inch, and is led through an ordinary conduit to the enclosed ignition chamber 27.

Figure 2:
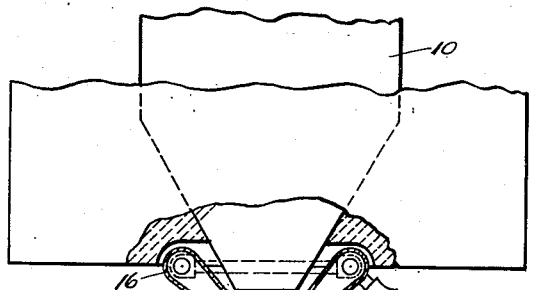
Figure 2 is an enlarged side elevation of a part of the apparatus illustrated in Figure 1 and showing the blast producing means in section.
Figure 3:
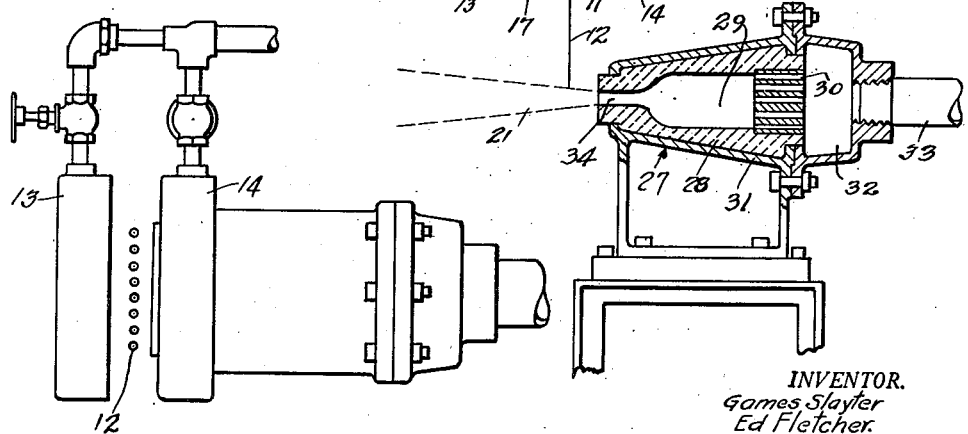
Figure 3 is a plan view of a part of the apparatus shown in Figure 1 of the drawing.

Referring to Figure 2 of the drawing, apparatus that may be used for ignition of the gaseous mixture to create the attenuating blast of the present invention comprises a body 28 of refractory material having the combustion chamber 29 therein. One end of the combustion chamber terminates at a perforated wall 30 having a plurality of small orifices extending therethrough. The other end of the chamber is provided with a wall having a restricted outlet or discharge passage 27 therein. The refractory body may be surrounded by a sheet metal shell 31 which extends past one end of the body to form an inlet chamber 32 between the end of the shell and the perforated wall 30. A suitable pipe 33 connects with the shell to feed the combustible gaseous mixture into the inlet chamber 32. The gaseous mixture enters the inlet chamber and passes through the orifices in the wall 30 at high velocity, but slows down in the chamber sufficiently to assure that stable ignition of the gas takes place. During operation the walls of the chamber 29 are heated by the burning gas and the hot walls tend to increase the rate at which the gas entering the chamber burns. The resulting high rate of combustion causes a great expansion of the products of combustion which, as they pass through the outlet passage 34, are accelerated into a very high velocity blast of intense heat.

At the beginning of the operation, the gaseous mixture is fed into the chamber 29 at velocities below the rate of flame propagation of the mixture in the atmosphere, but as the refractory walls heat up, the rate of feed of the gas into the chamber is increased above this rate. The aim is to feed as much gaseous mixture into the chamber as possible without causing the combustion to become unstable or take place at the outside of the chamber or to cease altogether.

The outlet passage 34 is substantially less in cross-sectional area than the chamber 29 so that the products of the combustion taking place within the chamber are accelerated as they pass through the restricted outlet to provide a blast of the gas moving at a very high velocity. The cross-sectional area of the outlet passage may be varied to some extent relative to the cross-sectional area of the chamber, depending upon the heat required in the blast leaving the outlet passage. Passages of greater cross-sectional area relative to the cross-sectional area of the chamber result in greater heat of the blast, but also cause a decrease in the velocity of the blast. Preferably, however, the cross-sectional area of the outlet passage 34 is no greater than necessary to obtain in the blast the heat required to raise the glass to be attenuated to the attenuating temperature. The best relation of the cross-sectional area of the passage 34 to the cross-sectional area of the chamber 29 may be determined by simple trial, and as an example may be within the range of 1:8 to 1:4; that is, the passage 34 is from $\frac{1}{8}$ to $\frac{1}{4}$ the cross-sectional area of the chamber 29. This arrangement provides the high velocity of the blast leaving the outlet passage coupled with sufficient heat of the blast to quickly melt the glass to be attenuated.

In operation, the glass to be attenuated is first melted in the feeder or bushing 10 and as it flows from the bushing is attenuated by the blasts from the blowers 13 and 14 into primary filaments of relatively large diameter, for example, about two ten-thousandths to ten one-thousandths of an inch in diameter. These primary filaments are fed by the attenuating blasts directly into the intensely hot high velocity blast issuing from the burner discharge opening 34 in directions transversely to and preferably at substantially right angles to the secondary blast 21. As the filaments enter the blast from the burner, they are melted or softened sufficiently by the blast to be attenuated at a high rate by the velocity of the blast to very fine glass fibers. This arrangement of blasts of gas to attenuate the streams flowing from the feeder and to feed the filaments thus formed directly into the secondary attenuating blast provides a fiber-forming unit of compact nature by permitting the secondary blast to be located immediately underneath the feeder 10.

With the above arrangement the rate of attenuation of the primary filaments at the feeder 10 is the same as the rate of feed of the filaments to the blast and this rate of feed is limited only by the speed at which the primary filaments are melted and attenuated into fibers by the secondary attenuating blast 21. If the rate of feed of the primary filaments to the blast is increased, the rate of attenuation of the primary filaments at the feeder is, of course, correspondingly increased.

With constant temperature at the feeder, the increase in the rate of attenuation at the feeder causes a decrease of the diameter of the primary filaments. But since these smaller filaments are fed to the blasts at a higher rate, the volume of glass fed into the blasts per unit of time remains the same. It follows that the rate of primary attenuation may be varied within rather wide limits, because of the existing relation between the rate of attenuation at the feeder 10 and the rate of feed of the primary filaments into the blast.

Variations in the size of the fibers formed by the secondary attenuating blast may be made most readily by varying the size of the primary filaments while maintaining the rate of primary attenuation and feed of the filaments the same, or by varying the rate at which the primary filaments are attenuated and hence the rate at which they are fed into the secondary blast while maintaining the size of the filaments constant, or by variations in both respects. Such changes in the diameter of the primary filaments relative to the rate of attenuation may be effected in any suitable way as by varying the temperature of the molten glass in the feeder or by changing the size of the orifices in the feeder through which the molten glass flows.

Although the above description refers to particular sizes, rates of attenuation of the primary filaments, and particular sizes of the finished fibers, the invention is not to be limited thereby since, rather than being limitations, these values are in the nature of examples to illustrate the principle of operation of the invention. The size of the primary filaments and the rate of attenuation thereof may, of course, be varied through a wide range, depending upon the particular type of gas employed to form the secondary attenuating blast and the fineness and uniformity required in the finished fibers. Selections of all these factors may be made as desired within the spirit of the present invention and the scope of the claims.

We claim:

1. The process of making glass fibers which comprises flowing a stream of glass from a body of molten glass and solidifying the stream at a point removed from said body, directing fluid blasts lengthwise of and against opposite sides of the stream to attenuate it into a filament prior to solidification thereof, establishing a secondary attenuating blast of gases at a temperature sufficient to soften the filament and at a velocity sufficient to attenuate the softened filament to fine fibers, and effecting penetration of the solidified filament endwise into said latter blast by the force applied to the filament by the first fluid blasts.

2. The process of making glass fibers which comprises burning a combustible gaseous mixture in a chamber, directing the products of combustion in a restricted path from the chamber and into the atmosphere in the form of a high velocity and high temperature blast, feeding a plurality of solid glass filaments endwise directly into the blast along paths extending transversely to the general direction of the blast by directing fluid blasts against opposite sides of the filaments as they flow from a source thereof and in the general direction of the lengths of the filaments, and melting and attenuating the filaments by the heat and force applied to the fibers by the first-named blast, said second-named blast effecting penetration of said filaments into said first-named blast.

3. The process of making fine glass fibers which comprises flowing streams of molten glass and progressively solidifying said streams, engaging said streams with fluid blasts moving in the general direction of stream flow to attenuate the stream to filaments prior to solidification thereof while maintaining said filaments in a predetermined path, and engaging the ends of the attenuated filaments with a second blast of gas at a temperature sufficient to melt the filaments and at a velocity sufficient to attenuate the softened filaments to form fine fibers.

4. The process of making fine glass fibers which comprises flowing streams of molten glass and progressively solidifying said streams, engaging said streams with fluid blasts moving in the general direction of stream flow to attenuate the streams to filaments prior to solidification thereof, and engaging the ends of the attenuated filaments with a second blast of gas moving transversely to the first-named blasts and at a temperature sufficient to melt the solidified filaments and at a velocity sufficient to progressively attenuate the softened filaments to form fine fibers, said first-named blasts effecting penetration of said filaments into said second blast.

5. Apparatus for making fine glass fibers comprising a receptacle for molten glass having orifices in a wall thereof through which flow streams of molten glass, blowers disposed in proximity to and at opposite sides of the orifices and arranged to direct low velocity blasts of fluid under pressure in the general direction of the flow of the glass streams and onto the latter to attenuate and cool the streams to form solid filaments, means positioned at one side of the path of travel of the filaments and including a burner having a combustion chamber therein and a restricted outlet port leading from said chamber to the atmosphere for directing a high temperature, high velocity blast transversely of the direction of travel of the filaments to engage the ends of the filaments and melt and attenuate the filaments.

6. Apparatus for making fine glass fibers comprising means for flowing streams of molten glass, blowers arranged in proximity to the source of said streams to direct low velocity blasts of cooling fluid at a temperature substantially below that of the streams onto the streams in the general direction of stream flow to attenuate the streams to form solid filaments, said blasts guiding said filaments, and a burner spaced in the direction of stream flow from said blowers for directing an intensely hot high velocity blast onto the ends of said filaments to melt the filaments and attenuate them to fine fibers.

7. Apparatus for making fine glass fibers comprising a receptacle for molten glass having orifices in a wall thereof through which flow streams of molten glass, blowers at opposite sides of and in proximity to the orifices to direct blasts of gas onto the streams in the general direction of stream flow to attenuate and cool the streams to a degree whereby they are sufficiently solidified to be projected transversely into a melting and attenuating blast while maintaining the alignment of the streams, and a burner spaced in the direction of stream flow from said blowers and more remote from said receptacle than said blowers for directing an intensely hot high velocity blast onto the ends of the filaments and in a direction transversely of the direction of travel of the filaments as they are attenuated to melt the filaments and further attenuate them to fine fibers.

GAMES SLAYTER.
ED FLETCHER.

REFERENCES CITED

The following references are of record in the file of this patent:

UNITED STATES PATENTS

| Number | Name | Date |
|---|---|---|
| 1,689,551 | Hammond | Oct. 30, 1928 |
| 2,126,411 | Powell | Aug. 9, 1938 |
| 2,133,235 | Slayter | Oct. 11, 1938 |
| 2,172,153 | McClure | Sept. 5, 1939 |
| 2,175,225 | Slayter | Oct. 10, 1939 |
| 2,272,588 | Simison | Feb. 10, 1942 |